United States Patent [19]
Kajiwara et al.

[11] Patent Number: 5,766,540
[45] Date of Patent: Jun. 16, 1998

[54] CELLULOSE FOOD CASING MANUFACTURING METHOD

[75] Inventors: Edward Makoto Kajiwara, Park Ridge; Joseph Robert Walta, LaGrange; Ronald Joseph Jerantowski, Hickory Hills, all of Ill.

[73] Assignee: Viskase Corporation, Chicago, Ill.

[21] Appl. No.: 827,130

[22] Filed: Mar. 27, 1997

[51] Int. Cl.⁶ .......................... B29C 47/00; B29C 47/20
[52] U.S. Cl. .......................... 264/559; 264/187; 264/203; 264/209.2; 264/209.5; 264/211.11; 264/561; 264/562; 264/563; 425/71; 425/380; 425/467
[58] Field of Search ........................... 264/187, 203, 264/209.2, 209.5, 211.11, 559, 561, 562, 563; 425/71, 380, 467

[56] References Cited

U.S. PATENT DOCUMENTS

| | | | |
|---|---|---|---|
| 2,105,273 | 1/1938 | Smith | 493/274 |
| 2,144,900 | 1/1939 | Smith | 156/218 |
| 3,193,547 | 7/1965 | Schott, Jr. | 264/209.5 |
| 3,655,846 | 4/1972 | Kanoh et al. | 264/559 |
| 3,819,776 | 6/1974 | Robinson et al. | 264/40.3 |
| 3,976,410 | 8/1976 | Jack et al. | 425/71 |
| 4,003,973 | 1/1977 | Kurokawa et al. | 264/101 |
| 4,195,054 | 3/1980 | Verellen et al. | 264/558 |
| 4,203,942 | 5/1980 | Sims, Jr. et al. | 264/559 |
| 4,317,794 | 3/1982 | Gord et al. | 264/559 |
| 5,277,857 | 1/1994 | Nicholson et al. | 264/187 |
| 5,451,364 | 9/1995 | Ducharme Jr. et al. | 264/559 |
| 5,607,639 | 3/1997 | Zikeli et al. | 264/561 |

*Primary Examiner*—Leo B. Tentoni
*Attorney, Agent, or Firm*—Roger Aceto

[57] ABSTRACT

The tubular extrusion of a thermoplastic nonderivatized cellulose solution about a mandrel and through a long air gap in excess of 304 mm is facilitated by use of a mandrel which is extensible from the extrusion die. On extrusion start-up, the mandrel extends a short length from the die. For steady-state operation, the mandrel is extended its full length from the die. Also disclosed is a mandrel structure to facilitate the introduction of a nonsolvent liquid into the interior of the extruded tube at a high location on start-up of extrusion and at a lower location during steady-state operation.

25 Claims, 3 Drawing Sheets

CELLULOSE FOOD CASING MANUFACTURING METHOD

TECHNICAL FIELD

The present invention relates to a method and apparatus of forming a seamless cellulose tube, suitable for use as a food casing, using a solution of nonderivatized cellulose, tertiary amine N-oxide and water.

BACKGROUND OF THE INVENTION

Cellulose food casings are well known in the art and are widely used in the production of stuffed food products such as sausages and the like. Cellulose food casings generally are seamless tubes formed of a regenerated cellulose and contain a plasticizer such as water and/or a polyol such as glycerine. Plasticization is necessary because otherwise the cellulose tube is too brittle for handling and commercial use.

Cellulose food casings generally are used in one of two forms. In one form the casing consists of a tubular film of pure regenerated and nonreinforced cellulose having a wall thickness ranging from about 0.025 mm to about 0.076 mm and made in tube diameters of about 14.5 mm to 203.2 mm. The second form is a reinforced casing wherein the tubular wall of the casing consists of a regenerated cellulose bonded to a paper web. Such reinforced casings are commonly called "fibrous" casings to distinguish them from the non-reinforced cellulose casings. Fibrous casings have a wall thickness in the range of 0.050 mm to 0.102 mm thick and are made in diameters of about 40.6 mm to 193 mm or greater. The present invention relates to manufacture of the nonreinforced type of cellulose casing hereinafter referred to simply as "cellulose casing".

The cellulose for making casing is most commonly produced by the well known and so called "viscose process" wherein viscose, a soluble cellulose derivative, is extruded as a tubular film through an annular die into coagulating and regenerating baths to produce a tube of regenerated cellulose. This tube is subsequently washed, plasticized with glycerine or other polyol, and dried. Drying usually is accomplished while the tube is inflated with air at a pressure sufficient both to maintain a constant tube diameter and to orient the film.

The present invention involves an alternate cellulose production method in which a cellulose solution is formed by means of a simple dissolution rather than requiring the formation of a cellulose derivative prior to forming a soluble substance (as in the viscose process). A cellulose dissolution process is described, for example, in U.S. Pat. No. 2,179,181 wherein a natural cellulose is dissolved by a tertiary amine N-oxide to produce solutions of relatively low solids content. The cellulose in the resulting solution is "nonderivatized" in that the natural cellulose was not chemically reacted prior to dissolution to produce a soluble cellulose derivative as would occur for example, in the viscose process. U.S. Pat. No. 3,447,939 discloses use of N-methyl-morpholine-N-oxide (NMMO) as the tertiary amine N-oxide solvent wherein the resulting solutions, while having a low solids content, nevertheless can be used in chemical reactions involving the dissolved compound, or to precipitate the cellulose to form a film or filament.

More recent patents such as U.S. Pat. Nos. 4,145,532 and 4,426,288 improve upon the teachings of the '939 Patent.

U.S. Pat. No. 5,277,857 discloses a method and apparatus for manufacturing cellulose food casing from a solution comprising non-derivatized cellulose, NMMO and water.

In the '857 Patent, nonderivatized cellulose in a molten state is extruded as a tubular film into a nonsolvent liquid such as a water bath. In the water bath, the NMMO solvent is removed to regenerate or precipitate the nonderivatized cellulose. This forms a gel tube which is treated with water, a polyhydric alcohol such as glycerine, or other water soluble softening agent such as a polyalkylene oxide or a polyalkylene glycol prior to drying.

More specifically, in the manufacturing method of the '857 Patent, the following steps are employed:

a) providing a solution comprising nonderivatized cellulose in an amine oxide solvent;

b) downwardly extruding the solution from an annular orifice to form a seamless tube of at least 14.5 mm diameter;

c) passing the extruded seamless tube of solution downwardly from the orifice first through an air gap and then into a bath of nonsolvent liquid;

d) introducing a nonsolvent liquid into the interior of said extruded seamless tube at a location below the annular orifice and above the surface of the bath of nonsolvent liquid;

e) downwardly flowing the nonsolvent liquid concurrently with the inner surface of said downwardly moving extruded seamless tube of solution and into said bath as the tube moves through said air gap, and contacting the inner surface of said extruded seamless tube with nonsolvent liquid in the course of said concurrent flow to precipitate nonderivatized cellulose at said inner surface from said solution;

f) maintaining said extruded seamless tube of solution in said bath with its inner and outer surfaces in direct contact with said nonsolvent liquid thereby further precipitating said nonderivatized cellulose from said solution and forming a nonderivatized cellulose tube; and g) removing said nonderivatized cellulose tube from said bath and contacting same with a water soluble softener.

In U.S. Pat. No. 5,451,364 the manufacturing method as disclosed in the prior '857 Patent is improved by the discovery that extruding the thermoplastic cellulose solution through a long air gap improves the properties of the resulting tubular cellulose film. In particular, the '364 Patent discloses that the air gap should be over 152.4 mm and preferably from 152.4 mm to 304.88 mm long and perhaps longer.

Both the '364 and '857 Patents further disclose the use of a mandrel which depends from the extrusion die and about which the thermoplastic cellulose solution is extruded. This mandrel extends through the air gap and has its lower end face disposed below the level of the nonsolvent liquid bath. The mandrel for most of its length is a slender shaft. The lower portion, however, is larger in diameter and is as large as, or larger than, the extruded tube diameter so it contacts around the entire inner circumference of the extruded tube. The mandrel shaft, being smaller in diameter, is radially spaced from the inner surface of the extruded tube.

The large diameter lower portion of the mandrel serves to size the tube as it enters the bath. Also, since it contacts the extruded tube, the enlarged lower portion of the mandrel together with the extrusion die provide spaced bearing points for stabilizing the extruded tube and preventing it from wandering.

The mandrel also is used to introduce a nonsolvent liquid into the interior of the extruded tube. One function of this introduced nonsolvent liquid, among others, is to lubricate around the circumference of the lower portion of the mandrel to prevent the extruded tube from binding as it passes over the surface of the lower portion or blocking when it later is collapsed to a flat width.

In this regard, a nonsolvent liquid or "inner bath" is introduced inside the extruded tube through ports in the mandrel shaft. This inner bath flows down the mandrel and pools where the extruded tube meets the enlarged lower end of the mandrel. This pooling distributes the nonsolvent around the mandrel so the entire outer circumference of the mandrel lower portion is wetted. Nonsolvent liquid then flows off the mandrel and to the bath within the extruded tube.

It now has been found that a still longer air gap and mandrel will further improve the properties of the resulting tubular cellulose film. However, at an air gap length of over 304.8 mm and up to 500 mm or more, problems have been encountered on the start-up of the extrusion operation with the mandrel structure as disclosed in the '857 and '364 Patents.

In particular, with a mandrel longer than about 304.8 mm to 381 mm, it becomes difficult to guide the leading end of the extruded tube down along the entire length of the long mandrel shaft while keeping it from touching the mandrel surface. Should the extruded tube contact any unlubricated portion of the mandrel shaft, it will bind immediately to the mandrel and thwart the startup. With a long mandrel it also has been found that surface tension causes the nonsolvent liquid which is introduced through the mandrel to run in streams down the mandrel shaft rather than provide a uniform coating around the entire surface of the mandrel shaft. Thus, with a long mandrel there are sections of the mandrel surface which are free of the lubricating nonsolvent liquid. Accordingly, the leading end of the extruded tube must be kept open and spaced from the mandrel surface as it is drawn down to the enlarged lower end to avoid accidental contact with any dry portion of the mandrel shaft. The length of the air gap of 381 mm to 500 mm or more also causes the extruded tube to neck down as it falls by gravity or is drawn from the die. This necking decreases the extruded tube diameter which further reduces clearance between the mandrel shaft and the inside diameter of the extruded tube and increases the likelihood that any waiver of the tube during extrusion start-up will cause its inner surface to contact a dry or unlubricated portion of the mandrel shaft and bind to the mandrel surface. Once the open end of the tube is drawn over the enlarged lower portion of the mandrel, it is less likely the tube will come into contact with the shaft because the tube, in effect, becomes supported at two spaced locations, namely at the extrusion die and at the enlarged lower end of the mandrel.

It also is important that the extruded tube not contact the nonsolvent until there is uniform contact around the entire inner and outer circumference as the tube passes first over the enlarged mandrel end and then into the nonsolvent bath. It has been found that spot contact of the inner surface of the extruded tube with the introduced nonsolvent along the mandrel shaft produces a weak spot in the resulting cellulose film. Thus, while the nonsolvent will prevent the tube from binding to the mandrel shaft, it still is preferred that no contact occur between the extruded tube and either a wet or dry surface of the mandrel shaft prior to entering the pool of nonsolvent liquid about the enlarged lower end of the mandrel.

A still further problem of using a mandrel of 381 mm to 500 mm or more is that the inner bath tends to flow in a spiral path down and around the mandrel shaft due to a coriolis effect. With a long shaft, as described above, the spiral flow is fast enough to cause drops of the inner bath to fling off the shaft and against the inner surface of the extruded tube. This spot contact, as previously noted, adversely effects the properties of the resulting cellulose film.

Thus, use of a long air gap 381 mm to 500 mm or more presents several problems. One is how to allow for easily drawing the leading end of the extruded tube down along the long mandrel shaft and over the enlarged lower end of the mandrel without contacting any dry or unlubricated portion of the mandrel surface on start-up. Another is how to introduce the internal bath to avoid long drops in height so the internal bath does not spot the inside surface of the extruded tube.

The issue of possible adherence to the mandrel or spotting by the internal bath are more acute when extruding tubes of small diameters down to about 12.7 mm. At these tube diameters, there is little clearance between the outside diameter of the mandrel shaft and the inside diameter of the extruded tube and the clearance is still further reduced by the necking of the extruded tube as described above.

Accordingly, it is an object of the present invention to provide an improved method and apparatus for forming a seamless cellulose tube from an extruded thermoplastic nonderivatized cellulose solution and particularly for facilitating the extrusion start-up wherein extrusion is through a long air gap.

Another object is to prove an improved method and apparatus as described above which facilitates the drawing of the leading end of the extruded tube over a mandrel which extends through the air gap.

A further object is to provide a method and apparatus for downwardly extruding a thermoplastic nonderivatized cellulose solution through a long air gap and about a mandrel which avoids spotting of the inner surface of the tube by a nonsolvent liquid running down the mandrel surface.

A still further object is to provide a method and apparatus for extruding a seamless tube composed of a thermoplastic nonderivatized cellulose solution using a mandrel structure which avoids the flow of an internal nonsolvent bath through long drops.

Yet another object of the present invention is to provide a method and apparatus for extruding a thermoplastic cellulose solution as a tube which method and apparatus utilizes an extensible mandrel to facilitate the start-up of the extrusion operation.

SUMMARY OF THE INVENTION

In the present invention, a tube of thermoplastic nonderivatized cellulose is downwardly extruded through a long air gap and into a bath of nonsolvent liquid as is generally disclosed in U.S. Pat. Nos. 5,277,857 and 5,451,364, the disclosures which are incorporated herein by reference.

For purposes of this specification "nonderivatized" cellulose means a cellulose which has not been subjected to covalent bonding with a solvent or reagent but which has been dissolved by association with a solvent or reagent through Van der Waals forces such as hydrogen bonding. "Nonsolvent" means a liquid which is not a cellulose solvent.

The extrusion is about a mandrel which depends from the extrusion die. The mandrel has a shaft portion and a lower end portion which is larger in diameter than the shaft. The mandrel is long enough to extend through the air gap and into the bath of nonsolvent liquid. However, the mandrel is extensible from the die so that on start-up, the mandrel is in a raised position. This locates the lower end of the mandrel above the level of nonsolvent liquid in the bath and presents a relatively short mandrel for the start-up operation.

Since the mandrel presents a relatively short length at this point, the leading end of the extruded tube of the thermoplastic nonderivatized cellulose solution can be held open and led relatively easily along the mandrel stem and over the enlarged lower end of the mandrel. A nonsolvent liquid comprising an inner bath which is introduced through the mandrel stem, runs down the stem and pools around the enlarged lower end. This allows the leading end of the extruded tube to be drawn easily over the enlarged end of the mandrel. The extruded tube is then led down into the bath and laced around driven rolls for drawing the extruded tube through the bath.

After the leading end of the extruded tube is drawn passed the lower end of the mandrel, the mandrel is extended from the die until the mandrel spans the full air gap and the lower end of the mandrel is below the level of the nonsolvent liquid in the bath.

During the course of extending the mandrel, the location where the internal bath is introduced through the mandrel is shifted. In this respect, flow from the first location is terminated and flow is initiated from a second point which is lower than the first. This avoids the drawback of having the internal bath flow down substantially the full length of the mandrel when the mandrel is extended its full length.

Accordingly, the present invention may be characterized in one aspect thereof by a method of forming a seamless tubular film of cellulose from a thermoplastic solution composed of nonderivatied cellulose, a tertiary amine cellulose solvent and water by extruding downwardly through an air gap and into an outer bath of nonsolvent liquid, the method comprising the steps of:

a) extruding said solution downwardly from an annular die to form a seamless extruded tube of said solution, said extruding being through an air gap of at least 304 mm as measured between the die and the surface of the nonsolvent liquid in said outer bath;

b) said extruding occurring about a mandrel depending from said die, said mandrel having a small diameter shaft and a larger lower end, and the mandrel shaft being extensible from the die for changing the spacing of the mandrel lower end from the die;

c) withdrawing the mandrel shaft into the die for locating the mandrel lower end in the air gap such that the lowermost end of the mandrel is above the surface of nonsolvent liquid in said outer bath;

d) starting the extruding of the seamless tube when the mandrel lower end is located above the surface of the nonsolvent liquid in said bath;

e) drawing the leading end of the extruded tube along the mandrel, over the mandrel lower end, through the space between the mandrel lower end and the surface of nonsolvent liquid in said outer bath and then down into said outer bath; and f) extending the mandrel shaft from the die during the course of said extruding for moving the mandrel lower end down through the interior of the extruded tube until the mandrel lower end is located in the nonsolvent liquid of said outer bath.

In another aspect, the present invention is characterized by an apparatus for forming a seamless tubular film of cellulose comprising:

a) an annular extrusion die arranged and adapted for downwardly extruding a seamless tube composed of a thermoplastic solution of nonderivertized cellulose, a tertiary amine oxide cellulose solvent and water through an air gap and into an outer bath of nonsolvent liquid;

b) a mandrel depending from the extrusion die and being within the extruded tube;

c) said mandrel having a small diameter shaft and a larger diameter lower end and said shaft being extensible through said extrusion die from and between a first position wherein said mandrel lower end is above the level of nonsolvent liquid in said outer bath for the start of the tube extruding process and a second position wherein said mandrel lower end is in said outer bath for the continuation of the tube extruding process.

Other objects and advantages of this invention will be apparent from the ensuing detailed disclosure and appended claims.

DETAILED DESCRIPTION OF THE INVENTION

Figure 1:
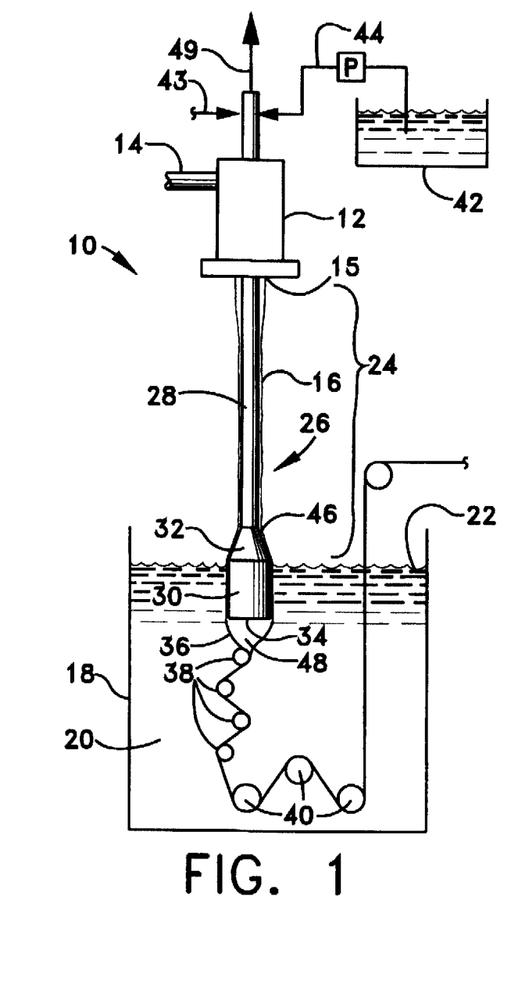
FIG. 1 is a schematic view showing the apparatus of the present invention during the course of steady-state extrusion.

Referring to the drawings, FIG. 1 shows the apparatus generally indicated at 10 during the course of steady-state operation. The apparatus includes a die 12 arranged to downwardly extrude a thermoplastic cellulose solution. The die inlet 14 receives the molten solution under pressure from any appropriate source (not shown). The source, for example, may be an extruder as disclosed in the '857 and '364 patents which melts and pumps ground pellets of the thermoplastic solution or a pumping system which delivers the thermoplastic solution to the die as it is made. The solution is generally a solution of a natural cellulose (such as wood pulp) dissolved in a cellulose solvent comprising N-methyl-morpholine-N-oxide (NMMO) and water. Methods of making an appropriate solution (hereafter called "dope") for extrusion as a tubular film are well known in the art and comprises no part of the present invention. It also is within the skill of the art to alter the composition and properties of such a solution to obtain desired properties of the cellulose article formed from the solution. Process parameters also effect the properties of the resulting article and reference is made to a further discussion of such parameters as set out, for example, in the '857 and '364 patents and in U.S. Pat. No. 5,658,525 the disclosures of which are incorporated herein by reference.

The die has an annular extrusion orifice 15 so the molten dope is extruded as a seamless tube indicated at 16. For purposes of extruding a small diameter food casing, the extrusion orifice is about 12–14 mm in diameter. As shown in FIG. 1, the die is arranged above a vessel 18 which contains a bath 20 (some times referred to as an "outer bath") comprising nonsolvent liquid. For purposes of the present invention, "nonsolvent" means a liquid which is not a cellulose solvent. Water or an aqueous solution containing a low concentration of NMMO are preferred nonsolvents for purposes of the present invention. The die is spaced well above the level 22 of the bath so the tube is extruded downwardly through a long air gap 24. This air gap may be 381 mm to 500 mm or more in length.

Depending from the die is a mandrel, generally indicated at 26, which extends from the die to below the bath level 22. The mandrel has a shaft portion 28 and a lower end 30. The lower end is larger in diameter than the shaft and preferably is equal to or most preferably is larger in diameter than the diameter of the annular extrusion orifice 15 of the die 12. The lower end of the mandrel, including a conical transition section 32 preferably are made of a hydrophobic material such as tetrafluoroethylene and has its lowermost end face 34 disposed below the bath level 22.

As the extruded tube 16 enters the bath, the NMMO solvent is drawn from the tube causing regeneration of the dissolved cellulose to form a so called "gel tube" 36 of pure cellulose. This gel tube is collapsed to a flat width by a series of fingers or baffles 38. The baffles 38 function as a ladder to collapse the tube to its flat width. Preferably, the horizontal position of each baffle 38 as viewed in FIG. 1 is adjustable. By adjusting the horizontal relationship between baffles, the correct position can be found to collapse the gel tube to its flat width in a wrinkle-free manner.

After collapsing to a flat width, the gel tube is drawn through an S-wrap formed by driven rollers 40. The S-wrap and driven rolls serve to draw the extruded tube 16 in the machine direction which causes a thinning of the tube wall and imparts a degree of machine direction orientation to the extruded tube in the air gap. The gel tube then is directed up and out of the bath vessel 18 for further processing. For example, it should be understood that the gel tube may still contain NMMO after leaving the bath vessel so that a further operation would be washing to remove as much NMMO cellulose solvent as possible. Subsequent operations also would include contacting the gel tube with a plasticizer such as glycerine or the like and then drying the tube to a desired water content while holding the tube at a desired inflated diameter. These subsequent operations likewise form no part of the present invention.

The tubular extrusion process, as disclosed in the '857 and '364 patents, further includes the introduction of air and a nonsolvent liquid into the interior of the extruded tube 16. Both air and the nonsolvent, hereafter called "the inner bath", are introduced through the mandrel. An air line 43 connected to the upper end of mandrel shaft 28 provides an air flow through the mandrel to openings (not shown) which vent the air into the interior of the extruded tube. One function of this air is to hold the extruded tube open at the start of the extrusion process. The nonsolvent liquid for the inner bath is contained in a vessel 42. From the vessel, it is pumped through flow line 44 to a conduit (not shown) which runs through the mandrel. One or more ports in the mandrel allow the inner bath to exit the mandrel and flow down the surface of the mandrel shaft 28. The inner bath is cooler than the extruded tube 16 so it draws heat from the extruded tube 16 and helps to cool the extruded tube in the air gap. It is believed that cooling in the air gap enhances properties of the resulting tubular film.

The inner bath flows down the mandrel shaft 28 and forms a pool 46 around the lower end of the mandrel. This pool provides lubrication to permit the passage of the extruded tube over the mandrel enlarged lower end 30. This pool further starts the regeneration of the cellulose at the inner surface of the extruded tube. The inner bath passes down between the mandrel lower end and the extruded tube and flows into the volume 48 of bath liquid within the tube and below the mandrel end face 34. Some of the liquid in this volume 48 remains within the gel tube when it is collapsed to a flat width by baffles 38. This portion of liquid from volume 48 prevents blocking of the flattened gel tube and is carried out with the flattened tube between rolls 40. During the course of operation, an excessive amount of internal bath liquid could accumulate in volume 48. Accordingly, it may be necessary to remove liquid from this volume by suction through a conduit (not shown) having an inlet (also not shown) in the lower end face 34 of the mandrel. In this fashion, liquid from this volume can be drawn up through the mandrel as indicated by arrow 49.

With an air gap 24 of 381 mm to 500 mm or even greater, the start-up of extrusion is difficult using a mandrel 26 which spans the full length of the air gap. It is noted above, that at the start of extrusion the leading end of the extruded tube 16 must not contact the mandrel shaft as the leading end is led down the mandrel, over the enlarged lower end 30 and into the bath 20. This is difficult to accomplish with a long mandrel. While lubrication of the mandrel shaft with an internal bath facilitates drawing the leading end of the extruded tube down the mandrel, introducing the internal bath high up on the mandrel so it can lubricate the full length of the shaft also presents a problem discussed above.

Figure 2:
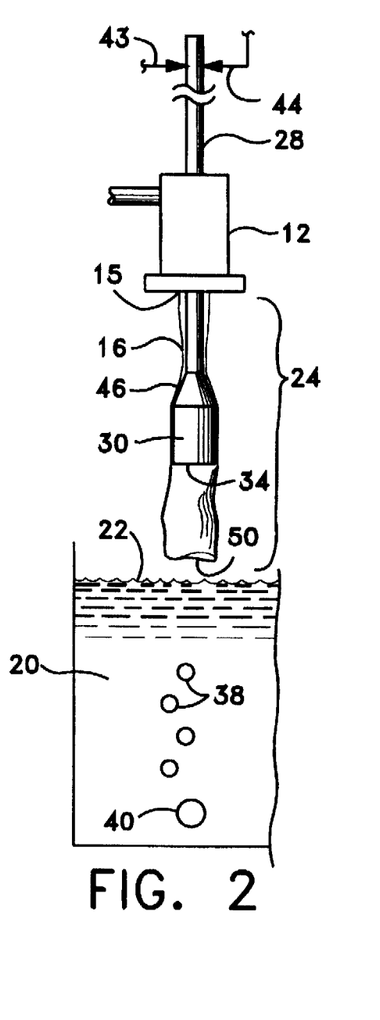
FIGS. 2 and 3 are views similar to FIG. 1 only showing the apparatus after start-up and prior to steady state operation.

These problems are resolved by the method and apparatus of the present invention. In this respect, the mandrel shaft 28 is arranged to slidably extend through the die 12. On start-up, as shown in FIG. 2, the mandrel shaft 28 is raised so the lower end face 34 of the mandrel is located in the air gap 24 and well above the bath level 22. When extrusion of tube 16 starts, air through line 43 and an internal bath through line 44 are introduced through the mandrel to mandrel openings (not shown) at a location near the extrusion orifice 15 of die 12. The air initially helps to keep the extruded tube open and the introduced internal bath lubricates the short mandrel structure depending from die 12. The short mandrel structure, as shown in FIG. 2, makes it easier to draw the leading end 50 of the extruded tube along the mandrel and over the enlarged lower end 30. As the leading end of the extruded tube passes over the enlarged end 30, the inner bath begins forming the pool 46 around the enlarged end of the mandrel. The leading end 50 is then extended into the bath 20 and laced around the baffles 38 and through the S-wrap rolls 40.

Figure 3:
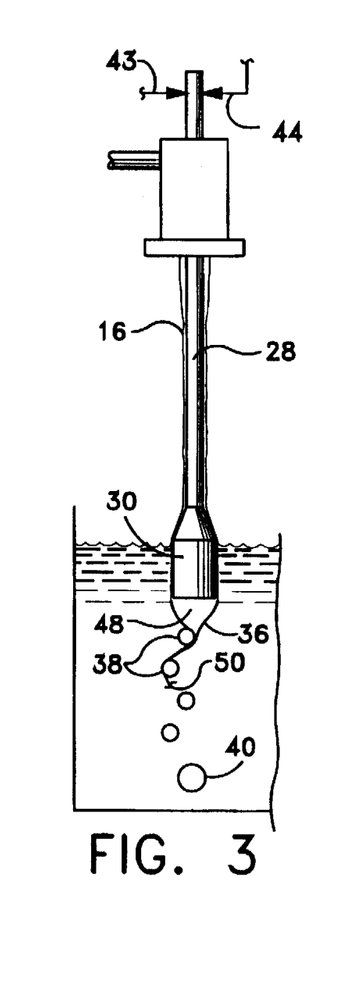

After the leading end 50 of the extruded tube is beyond the lowermost end 34 of the mandrel, the mandrel shaft 28 is moved downward, as shown in FIG. 3, to lengthen the effective length of mandrel. The shaft continues to move downward until the enlarged lower end 30 of the mandrel is below the bath level 22 for steady-state operation, as shown in FIG. 1. As the mandrel lower end moves downward, the air which is introduced through line 43 maintains a desired positive pressure within the extruded tube.

In the course of moving the mandrel downward, the location of the inner bath inlet is switched from a location near the die 12 to a location much lower on the mandrel. This avoids the problem noted above of the inner bath flowing on a spiral stream around the shaft with such speed that drops fling off and contact the inner surface of the extruded tube. However, as the mandrel shaft is lowered, air still is introduced at a higher location to fill the lengthening volume between the inside surface of the extruded tube and the outside surface of the mandrel shaft. This replacement introduction of air provides a positive pressure which prevents the extruded tube from collapsing against the mandrel and disrupting the extruding operation.

Figure 4:
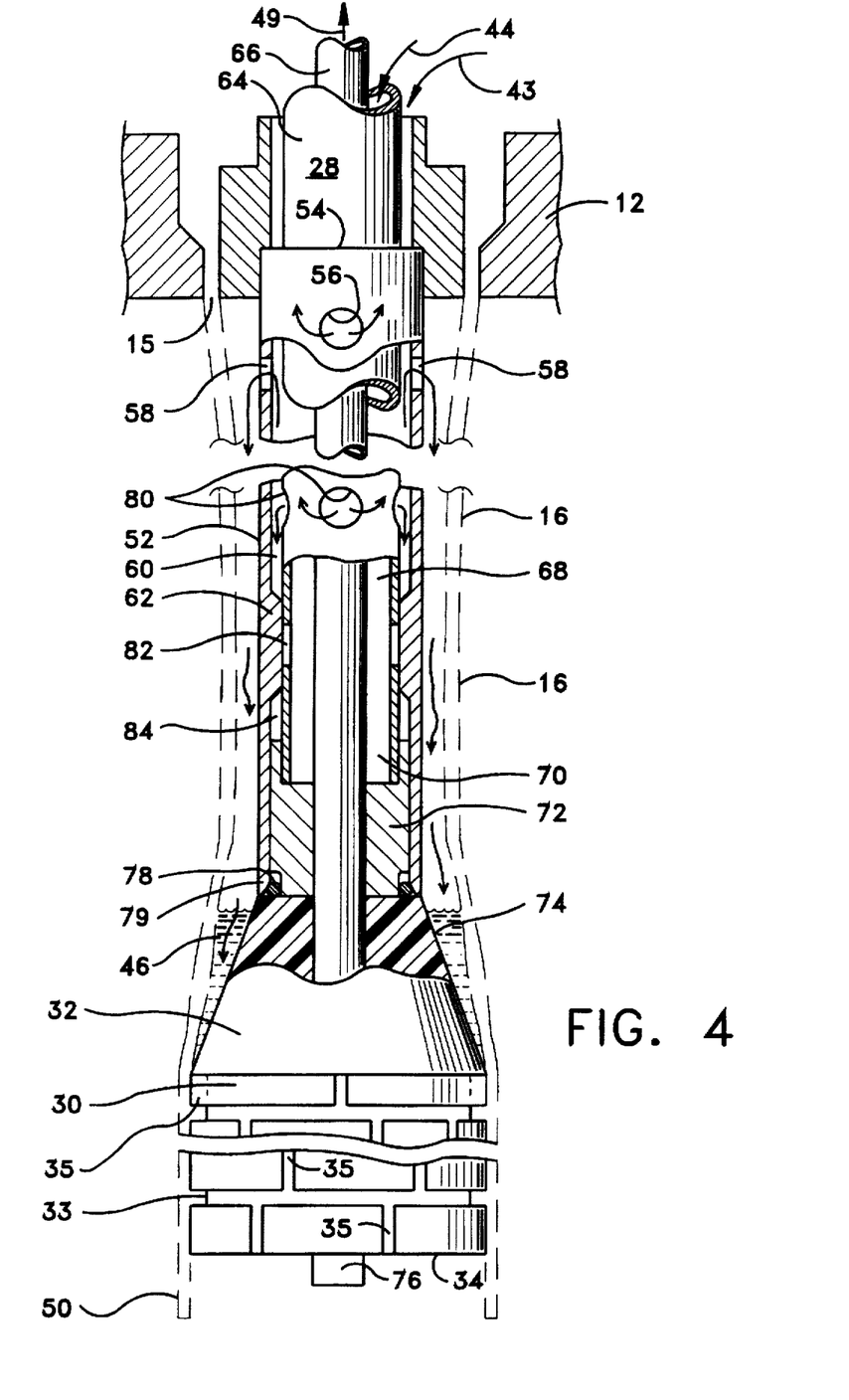
FIG. 4 is a view on an enlarged scale, partly broken away and in section showing the mandrel structure at the start-up of the extrusion operation.
Figure 5:
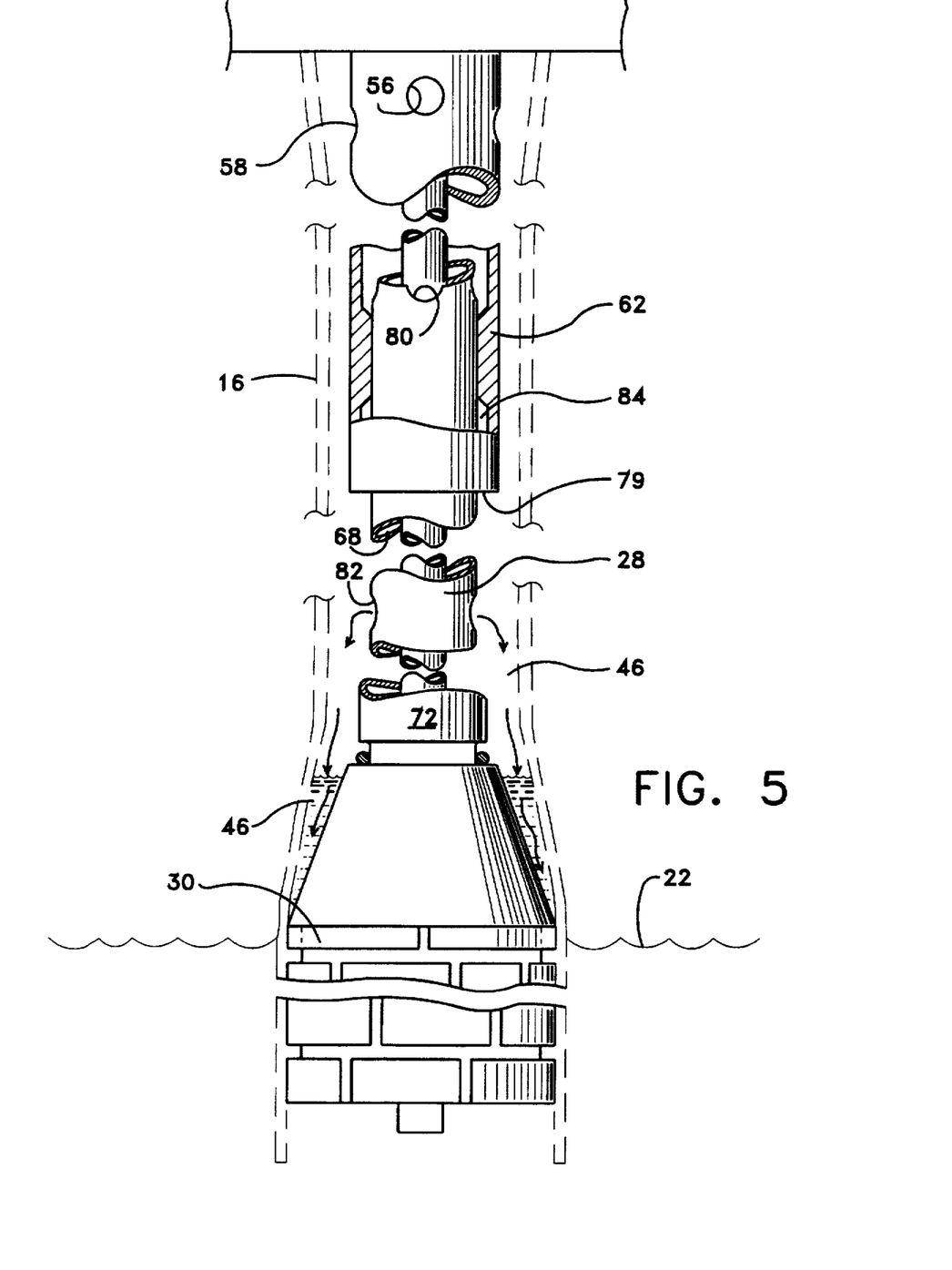
FIG. 5 is a view similar to FIG. 4 only showing the mandrel structure after start-up and during the course of steady-state operation.

The mandrel structure is illustrated in more detail in FIGS. 4 and 5. It should be appreciated that components are not necessarily drawn to scale in order to facilitate illustration of the mandrel structure.

As seen in FIG. 4, the mandrel 26 has a fixed sleeve 52 which supports the movable mandrel shaft 28. The sleeve is fixed at its upper end 54 to the die 12. Openings 56 and 58 in the sleeve provide the initial outlets for air and inner bath respectively, as set out herein below.

The movable shaft 28 extends concentrically through the sleeve so the sleeve and shaft define an annular space 60 therebetween. At its upper end, this space communicates with the air supply 43 shown in FIGS. 1–3. At its lower end, this space 60 is closed by an internal shoulder 62 which bears against shaft 28. This shoulder not only closes off the lower end of space 60 but provides bearing support for the shaft when the shaft is extended downward.

The mandrel shaft 28 is formed by concentric tubes including an outer tube 64 and an inner tube 66. These tubes 64, 66 define an annular space 68 therebetween. The space 68 is closed at its lower end 70 by a cap 72 over the end of the outer tube. The upper end of space 68 is in communication with the internal bath flow line 44 of FIGS. 1–3.

The inner tube 66 extends down through the end cap 72. Attached about the lower end of the inner tube is the mandrel enlarged end 30 including its conical transition section 32. Inner tube 66 has its lowermost end 76 opening through the lowermost end face 34 of the mandrel lower end 30. The upper end of the inner tube 66 is connected to a vacuum source (not shown) for purposes of aspirating bath liquid up through the inner tube as shown by arrow 49.

The conical transition section 32 at one end 74 has a diameter about equal to the diameter of sleeve 52. The conical section then flares outwardly at its other end to the full diameter of the enlarged mandrel lower end 30. Preferably, the mandrel lower end and its conical transition section are made of a low friction material such as tetrafluoroethylene.

The diameter of the mandrel lower end 30 preferably is between about 1.5 and 2.5 times the diameter of the extrusion orifice 15. This imparts a transverse stretch to the extruded tube and helps to set the desired gel tube diameter. The length of the lower end 30 also contributes to the dimensional stability of the gel tube which is formed. A length at full diameter of about 50 mm is preferred.

The surface of the larger lower end 30 is provided with a series of vertically spaced circumferential grooves 33 which are connected by vertical channels 35. These grooves and channels allow for the escape of air from around the mandrel lower end as further described hereinbelow.

Disposed on the smaller end 74 of conical section 32 is an o-ring or other appropriate seal member 78. With the shaft in the position, as shown in FIG. 4, the seal member 78 bears against the lower end 79 of sleeve 52 to seal off the lower end of the sleeve.

To complete the structure, the outer tube 64 of mandrel shaft 28 has a plurality of vertically spaced ports 80, 82 spaced along its length. When shaft 28 is in the position as shown in FIGS. 2 and 4 so that mandrel 26 is at its shortest depending length from die 12, the lower ports 82 are closed by the sleeve internal shoulder 62 (FIG. 4) whereas the upper ports 80 located above the internal shoulder are open into space 60.

The operation will be described beginning with reference to FIGS. 2 and 4. At the start of extrusion, the mandrel shaft 28 is in a raised position so it extends through the die 12 as shown in FIG. 2. This places the mandrel 26 at its shortest depending length which locates the lowermost end face 34 of the mandrel well above the bath level 22 (FIG. 2). The mandrel components are positioned as seen in FIG. 4.

A nonsolvent comprising the inner bath is pumped through line 44 and into the space 68 between the inner and outer conduits 66, 64 respectively which comprise shaft 28. The inner bath fills this space and passes through ports 80 into the space 60 between the shaft 28 and the surrounding sleeve 52. The inner bath fills the space 60 up to the level of openings 58. The inner bath then spills from these openings 58, runs down the outer surface of the sleeve 52 and over the enlarged lower end 30 of the mandrel. Liquid dripping from the lower end of the mandrel falls into the bath 20.

At the same time, air is introduced through line 43 and into space 60. Air introduced in this fashion vents from the sleeve through at least openings 56 which are slightly higher on the sleeve than the opening 58.

Extrusion is started and the leading end of the extruded tube 16 is drawn down and over the sleeve 52. The inner bath liquid spilling from openings 58 flows down along the outer surface of the sleeve. This provides lubrication to prevent the extruded tube from binding to the sleeve should contact occur. Air from openings 56 helps to hold the extruded tube open and away from the sleeve surface as the tube is drawn down along the sleeve. When the leading end 50 of the extruded tube is stretched and pulled over the mandrel lower end 30 (FIG. 2), the inner bath collects in pool 46 which forms around the lower end of the mandrel. Nonsolvent liquid from this pool is carried out from between the inner surface of the extruded tube and the outer surface of the enlarged end to lubricate this area and permit the drawing of the extruded tube 16 pass the mandrel lower end.

The leading end 50 of the extruded tube then passes into the outer bath 20 to form the gel tube 36 (FIG. 3). The gel tube is laced around the baffles 38 to flatten the tube. The flattened gel tube 36 then is put through the S-wrap rolls 40 and eventually led out of the vessel 18 (FIG. 1). After the leading end of the extruded tube is beyond the lowermost end 34 of the mandrel, the mandrel shaft 28 is lowered by sliding though the die 12.

As shaft 28 is extended, the o-ring seal 78 moves out of engagement with the lower end 79 of the sleeve. When the lower ports 82 move pass the sleeve internal shoulder 62, internal bath liquid floods into the sleeve volume 84 below the shoulder which is vacated by the cap 72. Some seepage of the internal bath can occur from around the cap. However, the main flow continues through those ports 80 still located above the internal shoulder and into space 60 so that the internal bath still issues from sleeve openings 58.

When the cap 72 is clear of the sleeve's lower end 79 (FIG. 5), internal bath liquid contained in the volume 84 spills out and flows over the cap. The internal bath liquid from space 68 can now flow directly from ports 82 below sleeve shoulder 62 and down along the shaft 28 and cap to the mandrel lower end 30. Clearing the cap 72 through the lower sleeve end 79 terminates the flow of internal bath out through the opening 58 high up on the sleeve because the internal bath liquid can now issue directly into the air gap 24 from the openings 82 in the mandrel shaft 28.

Air continues to issue from sleeve openings 56. The continued introduction of air into the extruded tube, as the shaft 28 is extended downward is important. In this respect, the introduction of air into the increasing volume between the mandrel shaft and extruded tube 16 maintains a differential pressure across the extruded tube to prevent the extruded tube from collapsing against the mandrel shaft 28.

When the shaft is fully extended, the mandrel lower end 30 is beneath the bath level 22 of the outer bath 20, as shown in FIGS. 1 and 5, for steady state extrusion operation. During steady state extrusion, the level of the pool 46 around the lower end of the mandrel is kept slightly higher than the level 22 of the outer bath 20 by about 50–60 mm. At this level, the pool 46 exerts a sufficient internal pressure on the extruded tube 16 to keep the tube radially spaced from the sleeve end 79 as the extruded tube necks down. This pool level also keeps the lower end of the extruded tube flared to facilitate the transition of the extruded tube over the larger diameter of the mandrel lower end 30. This higher pool or internal bath level is maintained primarily by controlling the air pressure within the extruded tube as provided by the introduction of air from line 43. In this respect, the level of pool 46 is visually monitored and the volume of air introduced through line 43 (FIG. 1) is manually adjusted to keep the pool at the desired level.

During the course of extrusion, gas bubbles may appear at the interface of the extruded tube and the mandrel lower end. The circumferential grooves 33 and vertical channels 35 connecting these grooves provide means for the passage of these gas bubbles into the volume 48 below the mandrel lowermost end face 34. Should the gas or internal bath liquid in volume 48 become excessive, they can be removed by suction up through the inner tube 66 as described hereinabove.

Thus, as shown in FIG. 5, in steady-state operation through the long air gap, the internal bath issues from ports 82 in the mandrel shaft 28. These ports 82 are considerably lower on the mandrel structure than the openings 58 from which the internal bath flowed on start-up. This avoids the problem presented by the spiral flow of the internal bath down substantially the full length of the mandrel as noted above.

The sleeve 52, with its upper end 54 rigidly connected to the die, remains stationery. This allows the internal shoulder 62 to provide bearing support for the extended mandrel shaft at a location spaced from the die. The stability provided by this bearing support is preferred especially in cases where the shaft is small enough in diameter to provide clearance from the inner surface of a small diameter extruded tube. For example, on leaving the die 12, the extruded tube 16 may be as small as 12.7 mm in diameter. The extruded tube cools and contracts in the air gap so the tube becomes smaller in diameter. Drawing through the air gap in the machine direction causes the tube to neck down which still further reduces diameter. Consequently, extruded tube 16 having an initial diameter of 12.7 mm, at some point along shaft 28 may have a diameter close to 6.55 mm. This means the shaft must be even smaller in diameter to provide radial clearance between it and the extruded tube 16.

At the lower end of the mandrel, the diameter of the extruded tube is stretched as it passes over the enlarged end 30. The depth of the pool 46 and resulting head pressure help with the opening and stretching of the extruded tube to facilitate passage over the mandrel lower end.

Thus, it should be appreciated that the method and apparatus of the present invention accomplishes its intended objects. The extensible mandrel facilitates the start-up operation while providing stability and support for the extruded tube during steady-state extrusion through a long air gap of up to 500 mm or more. At start-up, the internal bath is introduced at a higher elevation to insure that the start-up length of the mandrel is lubricated so as to prevent binding of the extruded tube leading end should it make contact with the mandrel. Thereafter, the introduction is switched to a lower elevation to avoid having the internal bath assume a spiral flow down and around the long mandrel shaft. As noted above, such spiral flow may allow drops of the internal bath to spin off from the mandrel and strike the inside surface of the extruded tube. This results in subsequent weak spots in the resulting tubular cellulose film product.

Although a preferred embodiment of the present invention has been described in detail, it is understood that modifications thereof may be made without changing the spirit and scope of the invention as claimed. For example, the sleeve 52 also can be slidable through the die rather than having one end 54 fixed to the die as shown. Also, the exact composition of the extruded dope, extrusion rates, draw rations and other process parameters can be altered as desired to achieve desired properties of the resulting tubular film. Likewise, altering dimensions of the mandrel structure may result in altering film properties and are within the skill of the art. For example, increasing the length of the enlarged mandrel lower end which extends into the outer bath may provide the resulting film with enhanced diametrical uniformity. Such changes form no part of the present invention.

Having described the invention in detail, what is claimed as new is:

1. A method of initiating the tubular extrusion of a thermoplastic solution composed of a nonderivatized cellulose, a tertiary amine oxide cellulose solvent and water downwardly through an air gap and into an outer bath of a nonsolvent liquid, said method comprising the steps of:

a) extruding said solution downwardly from an annular die to form a seamless extruded tube of said solution, said extruding being through an air gap of at least 304 mm as measured between the die and the surface of the nonsolvent liquid in said outer bath;

b) said extruding occurring about a mandrel depending from said die, said mandrel having a small diameter shaft and a larger lower end, and the mandrel shaft being extensible from the die for changing the spacing of the mandrel lower end from the die;

c) withdrawing the mandrel shaft into the die for locating the mandrel lower end in the air gap such that the lowermost end of the mandrel is above the surface of nonsolvent liquid in said outer bath;

d) starting the extruding of the seamless tube when the mandrel lower end is located above the surface of the nonsolvent liquid in said bath;

e) drawing the leading end of the extruded tube along the mandrel, over the mandrel lower end, through the space between the mandrel lower end and the surface of nonsolvent liquid in said outer bath and then down into said outer bath; and f) extending the mandrel shaft from the die during the course of said extruding for moving the mandrel lower end down through the interior of the extruded tube until the mandrel lower end is located in the nonsolvent liquid of said outer bath.

2. A method as in claim 1 comprising starting said extruding after said mandrel has its lowermost end face located its shortest distance from said die.

3. A method as in claim 1 comprising:

a) introducing an inner bath of nonsolvent liquid into the interior of the extruded tube at a first location adjacent the die prior to the time when a leading end of the extruded tube is drawn over the mandrel lower end and flowing the introduced nonsolvent liquid down and over the mandrel lower end and into said outer bath;

b) continuing said introducing of inner bath at said first location until after the leading end of the extruded tube is drawn over the mandrel lower end;

c) extending the mandrel shaft from the die and moving the mandrel lower end down through the interior of the extruded tube until the mandrel lower end is below the level of nonsolvent liquid in said outer bath;

d) terminating the introduction of the inner bath of nonsolvent liquid from said first location; and e) introducing the inner bath of nonsolvent liquid into the interior of the extruded tube at a second location spaced below the first location and above the mandrel lower end.

4. A method as in claim 3 comprising introducing air into the interior of the extruded tube at a location adjacent the die and above said first location for the introduction of the inner bath into the interior of the extruded tube.

5. A method as in claim 3 including introducing air into the interior of the extruded tube while extending the mandrel shaft from the die.

6. A method as in claim 3 comprising forming a pool of the inner bath around the mandrel lower end and maintaining the level of the pool above the level of the nonsolvent liquid in said outer bath.

7. A method as in claim 3 wherein introducing the inner bath of nonsolvent liquid into the interior of the extruded tube at the first location comprises the steps of:

a) locating the mandrel shaft in a sleeve having an upper end fixed to the die, the sleeve and mandrel shaft defining an annular channel therebetween and the sleeve having openings which define said first location for introducing said inner bath of nonsolvent liquid;

b) conveying said inner bath of nonsolvent liquid through a conduit in the mandrel shaft to ports which communicate with the annular channel;

c) effecting a seal between the sleeve and a portion of the mandrel shaft below the ports to seal off the lower end of the annular channel;

d) flowing said inner bath of nonsolvent liquid through the ports and into the annular channel and filling the annular channel with said inner bath nonsolvent liquid up to the level of the openings in the sleeve; and e) spilling said internal bath of nonsolvent liquid from the openings and into the interior of the extruded tube.

8. A method as in claim 7 wherein introducing said inner bath of nonsolvent liquid into the interior of the extruded tube at said second location comprises the steps of:

a) extending the mandrel shaft through the sleeve until the ports are below the seal; and b) discharging said inner bath of nonsolvent liquid through the ports and directly into the interior of the extruded tube and the inner bath flowing down the mandrel shaft to form a pool of nonsolvent liquid around the mandrel lower end.

9. A method as in claim 8 comprising the step of terminating the flow of said internal bath of nonsolvent liquid from said first location by moving the ports below the seal.

10. A method as in claim 8 comprising maintaining the level of the nonsolvent liquid in said pool above the level of the nonsolvent liquid in said outer bath.

11. A method as in claim 10 comprising controlling the level of the nonsolvent liquid in said pool by controlling air pressure within the extruded tube.

12. A method as in claim 1 comprising removing nonsolvent liquid from a volume below the mandrel lower end and within the extruded tube by withdrawing upwardly through an axial conduit in the mandrel shaft.

13. A method as in claim 1 comprising extruding the thermoplastic solution through an air gap of about 381 mm to about 500 mm.

14. A method as in claim I wherein the diameter of the mandrel lower end is larger than the extruded diameter of the extruded tube for stretching the diameter of the extruded tube as it passes over the mandrel lower end.

15. Apparatus for forming a seamless tube comprising a) an annular extrusion die arranged and adapted for downwardly extruding a seamless tube composed of a thermoplastic solution of nonderivertized cellulose, a tertiary amine oxide cellulose solvent and water through an air gap and into an outer bath of nonsolvent liquid;

b) a mandrel depending from the extrusion die and being within the extruded tube;

c) said mandrel having a small diameter shaft and a larger diameter lower end and said shaft being extensible through said extrusion die from and between a first position wherein said mandrel lower end is above the level of nonsolvent liquid in said outer bath for the start of the tube extruding process and a second position wherein said mandrel lower end is in said outer bath for the continuation of the tube extruding process.

16. Apparatus as in claim 15 wherein said mandrel comprises means for introducing an inner bath of a nonsolvent liquid into the interior of the extruded tube at a first location adjacent said die at the start of the tube extruding process and thereafter introducing said inner bath at a second location spaced below said first location upon the extension of said shaft through said extrusion die.

17. Apparatus as in claim 15 wherein said mandrel comprises:

a) a sleeve depending from said extrusion die and disposed about said shaft such that said sleeve and shaft define an annular space therebetween;

b) said sleeve having an upper end fixed to said extrusion die and said shaft being extensible through said sleeve;

c) said sleeve having an internal shoulder spaced from said upper end providing bearing support for said shaft as said shaft is extended from and between said first and second positions.

18. Apparatus as in claim 17 wherein:

a) said annular space forms a channel for the nonsolvent liquid of the inner bath;

b) seal means between said shaft and said sleeve for closing a lower end of said channel; and c) said sleeve having a first set of openings adjacent said die for the passage of the inner bath liquid out of said channel and said openings defining said first location for the introduction of the inner bath into the interior of the extruded tube.

19. Apparatus as in claim 18 wherein:

a) said shaft has an internal conduit for the nonsolvent liquid of the inner bath and said conduit has an upper end connected to a source of nonsolvent liquid; and b) said shaft having a plurality of ports providing communication between said internal conduit and said channel, said ports being located in said shaft above said seal means when said shaft is not extended from said die such that nonsolvent liquid flowing from said source and through said internal conduit passes out through said ports, fills said channel up to the level of said openings at said first location and then spills from said openings into the interior of the extruded tube.

20. Apparatus as in claim 19 wherein said internal shoulder comprises said seal means.

21. Apparatus as in claim 19 wherein said ports, when said shaft is extended from said die, are located below said seal means and provide direct communication from said conduit to the interior of the extruded tube thereby comprising said second location for the introduction of the nonsolvent liquid of the inner bath into the interior of the extruded tube.

22. Apparatus as in claim 19 wherein said shaft comprises an inner tube and a concentric outer tube, the space between said inner and outer tubes comprising said internal conduit for the nonsolvent liquid of the inner bath.

23. Apparatus as in claim 22 wherein said inner tube has an inlet opening in a lower end face of said mandrel lower end, said inner tube extending up through said die and having its upper end connected to a vacuum source.

24. Apparatus as in claim 18 wherein said mandrel lower end is larger in diameter than said sleeve and said seal means includes an O-ring which is carried on said mandrel lower end and which seats against the lower end of said sleeve when said shaft is at said first position.

25. Apparatus as in claim 17 wherein said space between said shaft and said sleeve is connected to a source of pressurized air and said sleeve having a second set of openings spaced above said first set for introducing air into the interior of said extruded tube.

* * * * *